(No Model.)  3 Sheets—Sheet 1.

J. G. W. ALDRIDGE.
BERTH AND SEAT FOR SHIPS OR RAILWAY CARS.

No. 447,020. Patented Feb. 24, 1891.

Witnesses
G. A. Barclay
J. Glover

Inventor
J. G. W. Aldridge
per Wheatley & MacKenzie (No Model.) 3 Sheets—Sheet 2.
J. G. W. ALDRIDGE.
BERTH AND SEAT FOR SHIPS OR RAILWAY CARS.
No. 447,020. Patented Feb. 24, 1891.
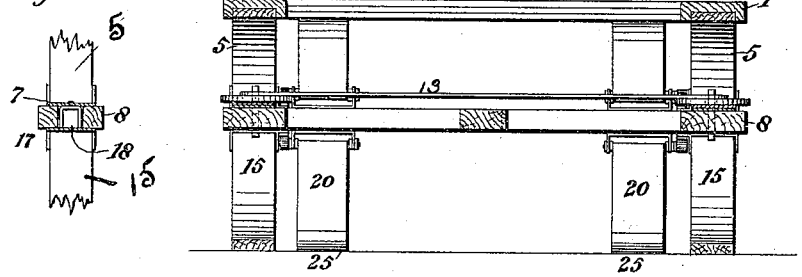
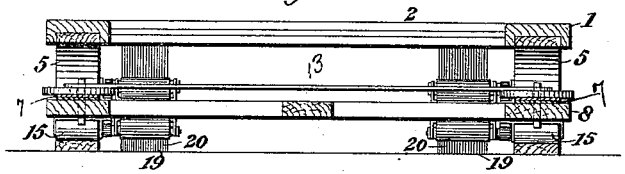
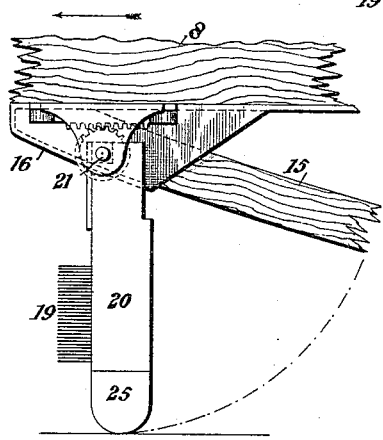
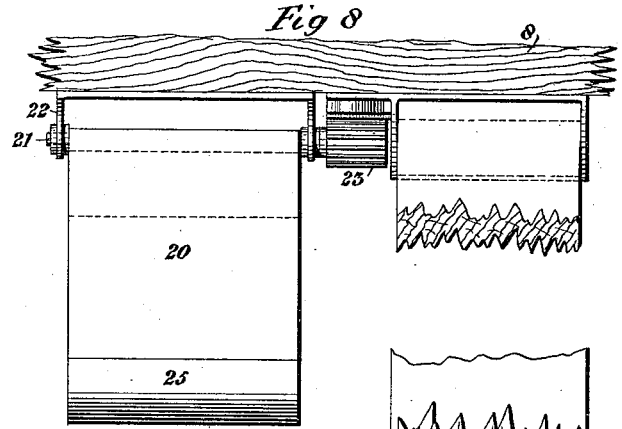
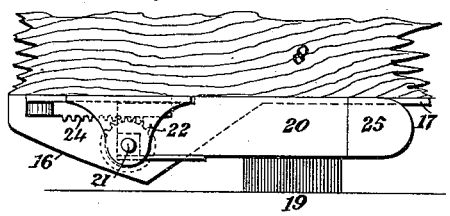
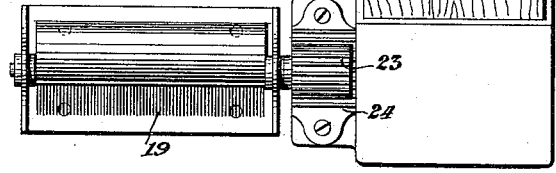
Witnesses
G. A. Barclay
J. Glover
Inventor
J. G. W. Aldridge
per Wheatley & Mackenzie (No Model.) 3 Sheets—Sheet 3.
J. G. W. ALDRIDGE.
BERTH AND SEAT FOR SHIPS OR RAILWAY CARS.
No. 447,020. Patented Feb. 24, 1891.
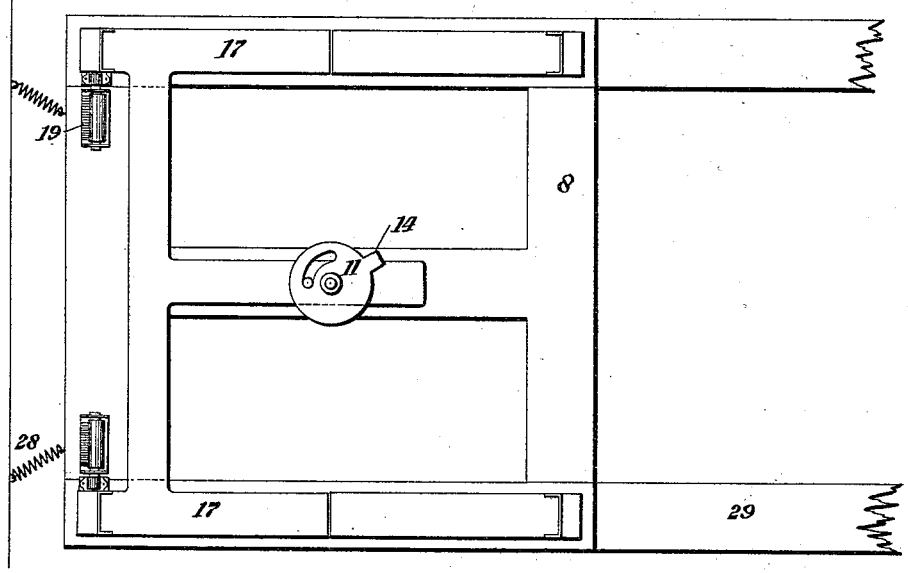
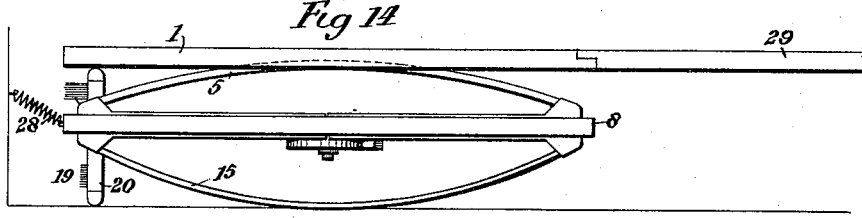
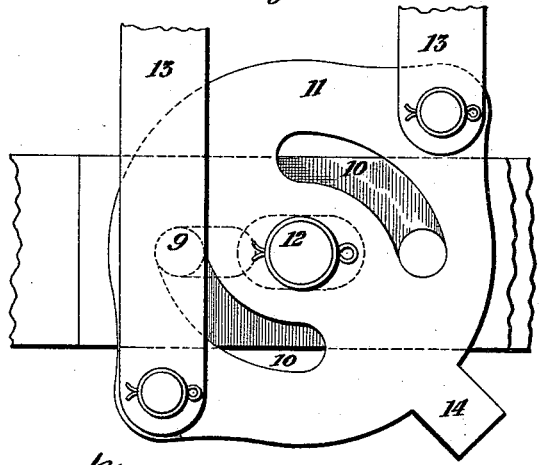
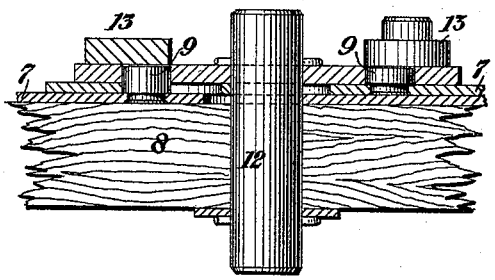
Witnesses
G. A. Barclay
J. Glover
Inventor
J. G. W. Aldridge
per Wheatley & Mackenzie

UNITED STATES PATENT OFFICE.

JAMES GEORGE WILLCOX ALDRIDGE, OF SOUTHAMPTON, ENGLAND.

BERTH AND SEAT FOR SHIPS OR RAILWAY-CARS.

SPECIFICATION forming part of Letters Patent No. 447,020, dated February 24, 1891.

Application filed January 29, 1890. Serial No. 338,442. (No model.) Patented in England August 29, 1888, No. 12,449; in France April 23, 1889, No. 197,661; in Belgium June 1, 1889, No. 86,473, and in Canada September 16, 1889, No. 32,261.

*To all whom it may concern:*

Be it known that I, JAMES GEORGE WILLCOX ALDRIDGE, a subject of the Queen of Great Britain and Ireland, residing at Southampton, in the county of Hants, England, have invented certain Improvements in Berths and Seats for Ships or Railway-Cars, (for which I have obtained British Patent No. 12,449, dated August 29, 1888; French Patent No. 197,661, dated April 23, 1889; Belgian Patent No. 86,473, dated June 1, 1889, and Canadian Patent No. 32,261, issued September 16, 1889,) of which the following is a specification.

The object of this invention for improvements in berths and seats for ships or railway-cars is to provide a berth or seat supported upon springs and that can readily be lowered or raised, as required, and that may be hinged upon one side, so as to turn up the berth out of the way or to form the back of a lower berth, thus utilizing the space apportioned for this purpose to the best advantage.

Figure 1:
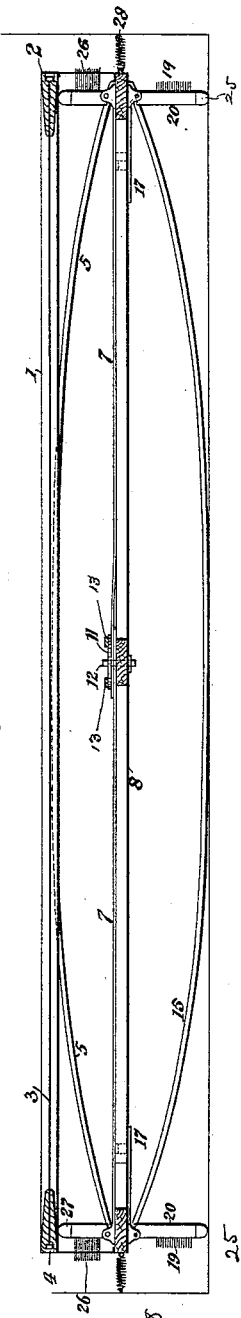
Figure 2:
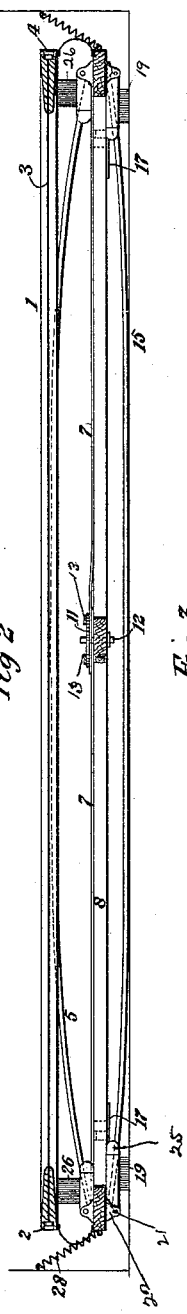
Figure 3:
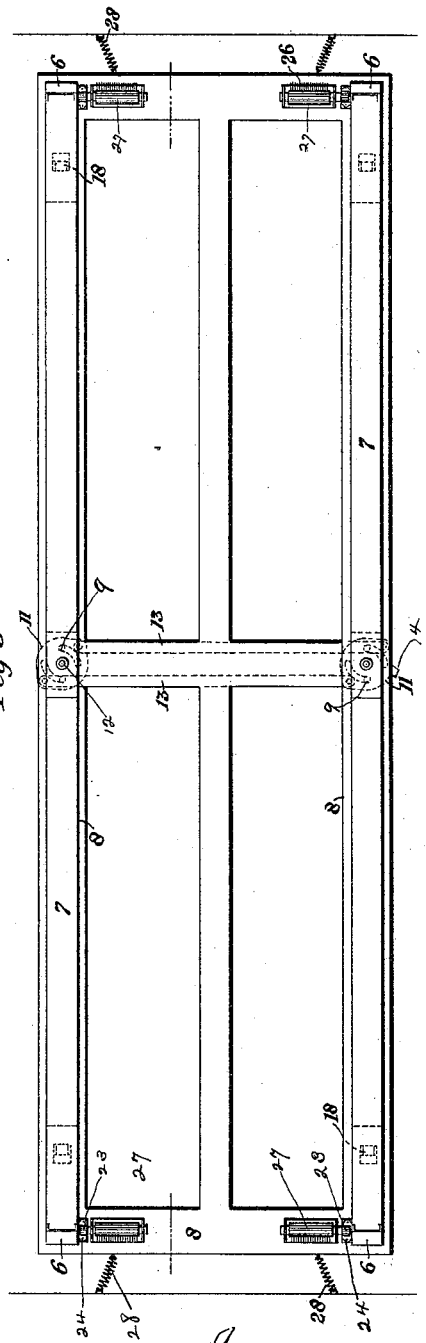

In the accompanying three sheets of drawings, Figure 1 is a vertical longitudinal section of a berth or seat shown in its raised position to form a seat constructed according to my invention, and Fig. 2 is a similar view showing the berth or seat in its lowered position to form a berth, and Fig. 3 is a plan with the upper frame removed of the same. Fig. 4 is a cross-section of Fig. 1. Fig. 5 is a cross-section of Fig. 2. Fig. 6 is a detail view showing the mode of connecting the strip operating the spring on the lower side of the skeleton frame to the strip operating the spring on the upper side of the said frame, so that the two are operated together. Fig. 7 is an end elevation showing to an enlarged scale the arrangement of mechanism for supporting and steadying the ends of the berth or seat, showing the position of mechanism when the berth or seat is in its raised position, and Fig. 8 is a front elevation, and Fig. 9 is a plan, of the same. Fig. 10 is a similar view to Fig. 7, showing the position of the mechanism when the berth or seat is in its lowered position. Fig. 11 is a plan showing to an enlarged scale the cam plate and connections for actuating the berth or seat in the position they occupy when the berth or seat is in its lowered position, and Fig. 12 is a vertical section of the same. Fig. 13 is an inverted plan of one-half of a modified arrangement suitable more especially for use in America, where the seats are opposite one another, and a portion is inserted between them when required for a bed; and Fig. 14 is a front elevation of the same.

The rectangular frame 1 2, serving to support the cushion of the seat or bedding of the berth, held on, if necessary, by straps, comprises the longitudinal sides 1 and ends 2. Wires 3 are arranged parallel to the longitudinal sides 1, and are tightened by means of the nuts 4. The sides 1 are grooved underneath to receive the springs 5, and may be of wood, the grooves being deepest at the middle of the sides 1 and dying out at each end. Each end of each spring 5 is received in a shoe or stirrup 6 on the outer end of a flat strip 7, situated exactly under the spring 5 and bearing upon a rectangular skeleton frame 8 of the same size as the top frame 1 2. The strips 7 extend inward slightly beyond the center of the frame 8, their free ends overlapping, as clearly shown. Near their free ends the strips 7 are provided with studs or rollers 9, working in curved slots 10 in cam-plates 11, rotating about an axis 12, mounted on the frame 8. The cam-plates 11 on the two sides of frame 8 are connected together by rods or links 13, so as to be operated simultaneously. The front cam-plate 11 has a projecting stud or socket 14, so that it can be turned when required to raise the berth or lower the seat by means of a lever-key.

Underneath the skeleton frame 8 are two springs 15, similar to the spring 5, with their ends supported in shoes 16 on strips 17, capable of sliding on the under side of the frame 8, the springs 15 being inverted relatively to the springs 5. The strips 17 are connected to the strips 7 by means of a saddle-piece 18, capable of sliding in a slot in the longitudinal sides of the frame 8, and riveted to the strips 7 and 17, so that they are operated together.

It will readily be seen that, supposing the berth to be in its lowered position, as shown in Fig. 2, and the cams 11 to be turned in the direction of the hands of a watch, the shoes 6 and 16 of the springs will be drawn toward the middle of the frame 8, and so the horizontal length of the springs 5 and 15 will be lessened, and they will consequently assume an increased arch shape and the berth will be raised to form a seat, as shown in Fig. 1. On turning the cam back again the shoes will move apart and increase the horizontal length of the springs and lower the seat.

In order to maintain the berth horizontal the skeleton frame 8 is yieldingly supported at its four corners when in its lowered position by means of brushes 19, secured to the blocks 20, rigidly mounted on shafts 21, working in bearings 22 on the under side of the skeleton frame 8. On the shafts 21 are pinions 23, gearing with racks 24, secured to the strips 17. On the ends of the blocks 20 are pieces of rubber or other elastic material 25. On operating the cams 11 to raise the berth the racks 24 actuate the pinions 23, and thus the blocks 20, so that when the berth is raised they assume the positions shown in Figs. 7, 8, and 9, with the elastic pieces 25 in contact with the ground, and thus maintain the seat horizontal when in this position.

Brushes 26 and elastic blocks 27 on blocks mounted on shafts working in bearings on the upper side of the frame 8, and worked by racks secured to the strips, serve to support the top frame 12 from the skeleton frame 8 in the same manner that the skeleton frame 8 is supported from the ground, as described above.

In order to lessen the work in raising the berths to form seats, the skeleton frame 8 is supported from the walls of the cabin or other place where it is situated by means of springs 28.

In the arrangement shown in Figs. 13 and 14 one cam only and one slot only is used for each seat, the left-hand shoes alone being movable. The space between two adjacent seats is bridged over by the bearers 29 when required for a bed to support the bedding of the berth.

I claim as my invention and desire to secure by Letters Patent—

1. A berth or seat consisting of a top frame supported on arch-shaped springs, and shoes engaging the ends of said springs and adjustable toward and from each other, substantially as described.

2. In a berth or seat, the combination of a top frame, a skeleton frame supporting said top frame, and arched springs 15 and brushes 19, supporting the skeleton frame, substantially as set forth.

3. In a berth or seat, the combination of a top frame, arched springs supporting said frame, shoes engaging the ends of said springs, and cams connected with said shoes and adapted to adjust them to raise or lower the seat, substantially as set forth.

4. In a berth or seat, the combination of a top frame, arched springs supporting said frame, shoes engaging the ends of said springs, and cams connected with said shoes and adapted to adjust them to raise or lower the seat, a skeleton frame carrying said shoes and adjusting means, inverted arched springs, shoes engaging the ends of the latter and supporting said skeleton frame, and means for adjusting the latter shoes, substantially as set forth.

5. In a berth or seat, the combination of a top frame, arched springs supporting the same, adjustable shoes engaging the ends of said springs, hinged blocks adapted to steady said frame and provided with elastic material on their ends and with brushes on their sides, pinions on the axes of said brushes, and racks engaging said pinions and connected with and operated by said shoes, substantially as set forth.

6. In a berth or seat, the combination of a frame, arched supporting-springs, and sliding shoes engaging the ends of the latter, hinged blocks adapted to support the ends of said frame, and connections between said blocks and shoes for turning the former when the latter are moved longitudinally, substantially as set forth.

In witness whereof I have hereunto set my hand in the presence of two witnesses.

JAMES GEORGE WILLCOX ALDRIDGE.

Witnesses:
T. J. ORMAN,
W. J. NORWOOD,
*Both of No. 17 Gracechurch Street, London.*